(12) United States Patent
Urban (10) Patent No.: US 7,349,526 B2
(45) Date of Patent: Mar. 25, 2008

(54) METHODS FOR TESTING CABLE PAIRS IN A TELECOMMUNICATIONS NETWORK

(76) Inventor: Blake Urban, 1410 4th St., Dr. NW. #205, Hickory, NC (US) 28601

(*) Notice: Subject to any disclaimer, the term of this patent is extended or adjusted under 35 U.S.C. 154(b) by 270 days.

(21) Appl. No.: 10/611,191

(22) Filed: Jun. 30, 2003

(65) Prior Publication Data

US 2004/0264651 A1   Dec. 30, 2004

(51) Int. Cl.
*H04M 1/24* (2006.01)
*H04M 3/08* (2006.01)
*H04M 3/22* (2006.01)

(52) U.S. Cl. .............. 379/29.01; 379/29.05; 379/27.01; 379/15.03

(58) Field of Classification Search ........... 379/1.01, 379/1.04, 14.01, 15.03, 22.01–22.05, 22.07, 379/24–25, 27.01–27.04, 28, 29.03–29.05, 379/32.04
See application file for complete search history.

(56) References Cited

U.S. PATENT DOCUMENTS

| | | | | |
|---|---|---|---|---|
| 4,945,555 A | * | 7/1990 | Teumer et al. | 379/21 |
| 5,309,499 A | * | 5/1994 | Webber | 379/9.05 |
| 5,974,115 A | * | 10/1999 | Chan et al. | 379/27.01 |
| 6,169,783 B1 | * | 1/2001 | Brooks et al. | 379/9 |
| 6,362,630 B1 | * | 3/2002 | Lowell et al. | 324/600 |
| 2001/0030521 A1 | * | 10/2001 | Hard et al. | 318/466 |
| 2002/0067802 A1 | * | 6/2002 | Smith et al. | 379/1.04 |

* cited by examiner

*Primary Examiner*—Quoc Tran
(74) *Attorney, Agent, or Firm*—Scott P. Zimmerman, PLLC; Geoff Sutcliffe; Jodi Hartman (57) ABSTRACT

Methods are disclosed for testing cable pairs in a telecommunications network. One method connects a test line to a telecommunications switch. The test line is connected to an inactive cable pair. The inactive cable pair has no telecommunications service established for the cable pair. The connection between the test line and the inactive cable pair creates a signal path from the telecommunications switch to the inactive cable pair, thus allowing the inactive cable pair to be tested for faults. This method allows a telecommunications service provider to determine the condition of available, inactive cable pairs.

13 Claims, 10 Drawing Sheets

METHODS FOR TESTING CABLE PAIRS IN A TELECOMMUNICATIONS NETWORK

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to telecommunications and, more particularly, to methods for testing inside and outside plant facilities that are independent of central office personnel.

2. Description of the Related Art

A telecommunications network operator may currently only test active cable pairs. These active cable pairs already have established and working telecommunications service. The telecommunications network operator uses equipment in a central office to test these active cable pairs. A Mechanized Loop Test (MLT), for example, or a Direct Access Testing Unit (DATU), is commonly performed to test these active lines. Both the Mechanized Loop Test and the Direct Access Testing Unit help determine the condition of the physical lines that originate from central office equipment.

A problem, however, is that both the Mechanized Loop Test and the Direct Access Testing Unit require recognized telephone lines. The Mechanized Loop Test and the Direct Access Testing Unit require that the physical wiring be in place and any translations or engineering built onto the circuits. Because both tests originate from a telecommunications switch, the physical wiring for the assigned cable pair must complete a circuit from the telecommunications switch. If the physical wiring is not complete, both the Mechanized Loop Test and the Direct Access Testing Unit simply test the telecommunications switch itself. The local loop is not tested.

If the physical wiring is not in place, central office personnel are often required. If, for example, trouble is isolated to an F1 underground cable pair (e.g., a cross-box to a central office cable head), both the Mechanized Loop Test and the Direct Access Testing Unit are ineffective. A field technician must use a meter to search for a good, vacant cable pair and then switch facilities to this vacant cable pair. The field technician, however, often requires someone in the central office to assist in verifying continuity and quality of the vacant cable pair.

An example helps illustrate the problem. Hundreds of customers order new service each day. If service has not yet been installed, the telecommunications network operator has no way of truly determining whether good facilities service a customer. The telecommunications network operator simply relies upon existing service records and issues a service order. This service order is based upon the accuracy of the service records. A technician is dispatched to install the service. Often times, however, the technician discovers that no good facilities service the customer—the service records did not accurately represent the availability and condition of the cable pairs. The technician then tries to locate an alternate, vacant cable pair in good condition. The technician calls the central office and enlists central office personnel to help test vacant cable pairs. If a good, vacant cable pair is not located, then the service order is referred to another technician for installation of facilities. The customer's service is further delayed while another technician is dispatched, and the telecommunications network operator incurs more expense for the installation.

If, however, the telecommunications network operator could test inactive cable pairs, repairs could be simpler and faster. If the telecommunications network operator could test inactive cable pairs, service problems could be quickly switched to good, vacant pair. There is, accordingly, a need for methods of testing cable pairs, methods that are capable of testing both active and inactive cable pairs, methods that allow for the automated testing of cable pairs, and methods of testing that quickly establish the condition of vacant cable pairs.

BRIEF SUMMARY OF THE INVENTION

The aforementioned problems, and other problems, are reduced by a cable pair testability unit. This cable pair testability unit provides the ability to test all cable pairs, regardless of whether the cable pair is active (e.g., having established service) or vacant and inactive (e.g., no established service). The cable pair testability unit can interface with the telecommunications network at various locations and, thus, allowing remote testing of cable pairs throughout the telecommunications network. This invention provides the ability to test cable pairs prior to installation and/or trouble dispatch to ensure adequate cable pairs are available for service. The cable pair testability unit allows a technician or other person to test a range of possible vacant cable pairs in the event that a defect was found on an assigned cable pair. Because vacant cable pairs may now be tested, cable pairs may now be reassigned prior to dispatch. The cable pair testability unit provides the technician the ability to use both the Mechanized Loop Test and the Direct Access Testing Unit on vacant/spare facilities. This invention permits remote testing of both working cable pairs and spare facilities and, thus, assists technicians with locating faulty F1 underground pairs.

One embodiment of this invention describes a method for testing cable pairs in a telecommunications network. A test line is connected between a telecommunications switch and an inactive cable pair. The inactive cable pair has no telecommunications service established for the cable pair. The connection between the test line and the inactive cable pair creates a signal path from the telecommunications switch to the inactive cable pair, thus allowing the inactive cable pair to be tested for faults. This method allows a telecommunications service provider to determine the condition of available, inactive cable pairs. Because the test line is connected between the telecommunications switch and the inactive cable pair, the inactive cable pair may be remotely tested independent of assistance from personnel in a central office.

Another embodiment of this invention also describes a method for testing cable pairs in a telecommunications network. This embodiment receives a request for a connection between a telecommunications switch and an inactive cable pair. The inactive cable pair has no telecommunications service established for the cable pair. The telecommunications switch is then connected to the inactive cable pair, thus creating a signal path from the telecommunications switch to the inactive cable pair. The request for the connection may be an interface that recognizes Dual Tone Multi-Frequencies. This interface would allow a technician or other person to place a telephone call and, utilizing Dual Tone Multi-Frequencies keys, electronically request the connection with the inactive cable pair. The request for the connection could also include an electronic command from a computer or other device. The electronic command would request the connection with the inactive cable pair.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention allows, for the first time, the ability to fully test all cable pairs. The cable pair testability unit of this invention provides the ability to test all cable pairs, regardless of whether the cable pair is active (e.g., having established service) or vacant and inactive (e.g., no established service). Cable pairs may be tested in both directions and without assistance from central office personnel. The cable pair testability unit may interface with the telecommunications network at various locations and, thus, allows remote testing of cable pairs throughout the telecommunications network. This invention provides the ability to test cable pairs prior to installation and/or trouble dispatch to ensure adequate cable pairs are available for service. The cable pair testability unit allows a technician or other person to test a range of possible vacant cable pairs in the event that a defect is found on an assigned cable pair. Because vacant cable pairs may now be tested, cable pairs may now be reassigned prior to dispatch. The cable pair testability unit provides technicians the ability to use both the Mechanized Loop Test and the Direct Access Testing Unit on vacant/spare facilities. This invention permits remote testing of both working cable pairs and spare facilities and, thus, assists facility technicians with locating faulty F1 underground pairs and other problems.

Figure 1:
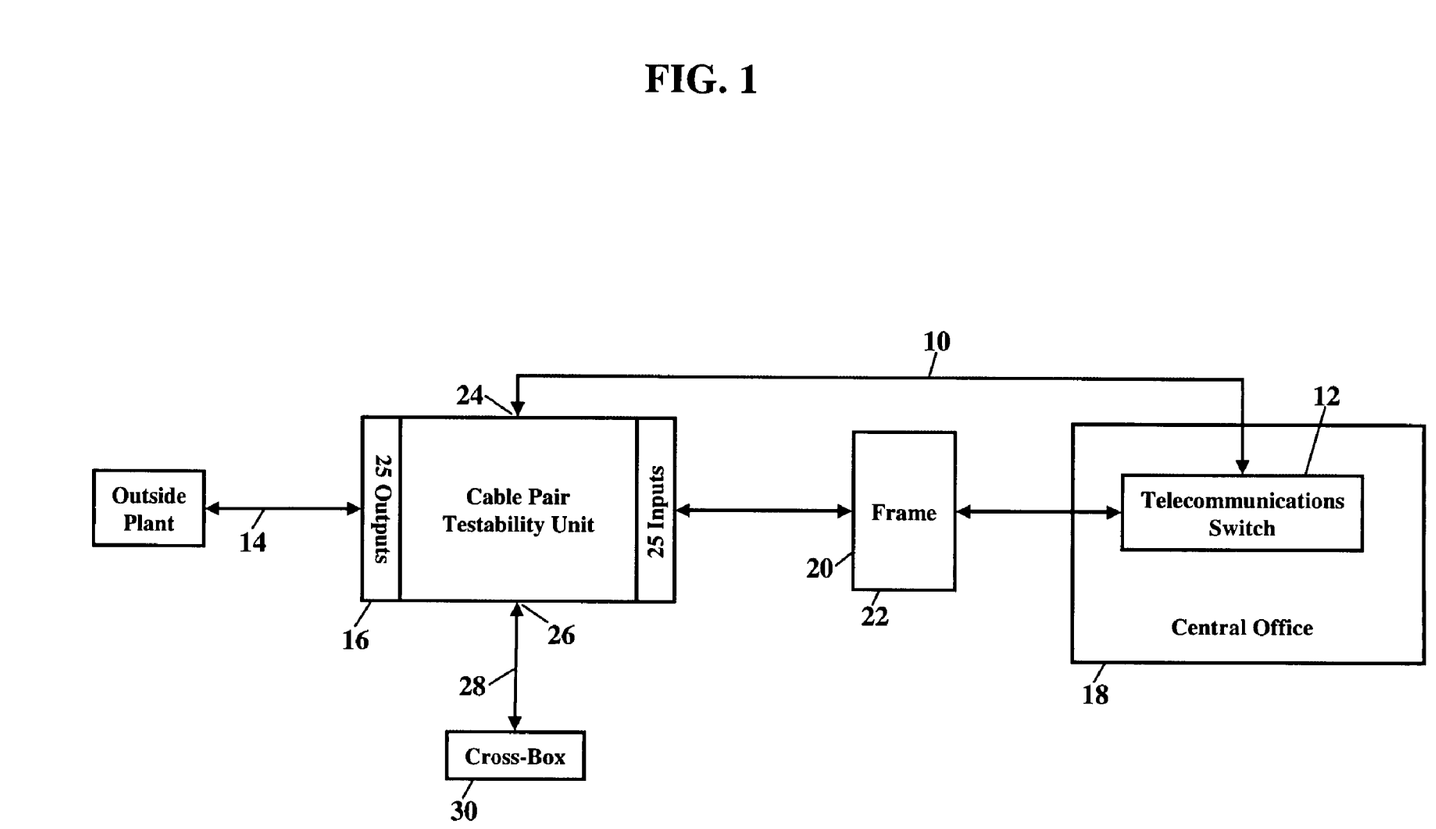
FIG. 1 is a schematic illustrating an embodiment of this invention.

FIG. 1 is a schematic illustrating an embodiment of this invention. A test line 10 is connected between a telecommunications switch 12 and an inactive cable pair 14. The inactive cable pair 14 has no telecommunications service established for the cable pair. A cable pair testability unit 16 connects the test line 10 to the inactive cable pair 14. The connection between the test line 10 and the inactive cable pair 14 creates a signal path from the telecommunications switch 12 to the inactive cable pair 14. This connection allows the inactive cable pair 14 to be tested for faults. The inactive cable pair 14, for example, may be tested remote from the telecommunications switch 12, and/or a Mechanized Loop Test may be performed on the inactive cable pair 14. A technician in the field, for example, may utilize the inactive cable pair 14 to isolate a fault (or "trouble") in another line, and this testing may be accomplished without the assistance of, or independent of, personnel in a central office 18.

The cable pair testability unit 16 may interface with multiple cable pairs. FIG. 1 shows the cable pair testability unit 16 bridging twenty five (25) cable pairs on a field-side 20 of a central office frame 22. The cable pair testability unit 16 in this embodiment has twenty five inputs and twenty five outputs. These inputs and outputs allow each cable pair to terminate at, and pass through, the cable pair testability unit 16. When a connection to the inactive cable pair 14 is desired, the cable pair testability unit 16 establishes an electrical connection between the test line 10 and the inactive cable pair 14. This electrical connection is established independent of, or without the assistance of, any personnel in a central office 18. Once testing is complete, the cable pair testability unit 16 may then release the electrical connection between the test line 10 and the inactive cable pair 14. Although the cable pair testability unit 16 of this example accepts twenty five (25) cable pairs, those of ordinary skill in the art will recognize the cable pair testability unit 16 may interface with more, or less, cable pairs.

The cable pair testability unit 16 may also include a switch-side port 24 and a field-side port 26. The test line 10 connects to the switch-side port 24, and a testing cable pair 28 connects to the field-side port 26. The test line 10 is typically a single pair copper wire, however, the test line 10 may include more or less wires. The testing cable pair 28 is a spare cable pair that travels to a remote location, such as a cross-box 30. The testing cable pair 28 would terminate inside the cross-box 30 and be clearly marked (e.g., the binding posts would be green-colored instead of the standard white and red of other cable pairs). This testing cable pair 28 allows a field technician to remotely test any cable pairs at the cross-box 30. When the technician wants to test a cable pair (such as the inactive cable pair 14), the technician requests that the cable pair testability unit 16 connect the testing cable pair 28 with the inactive cable pair 14. The cable pair testability unit 16 establishes an electrical cross-connection between the test line 10, the testing cable pair 28, and the inactive cable pair 14. This electrical connection allows the technician to test all along the connection from the central office 18. The technician may manually place shorts, grounds, voltage, or digital/analog signals on the inactive cable pair 14 to measure continuity, high-opens, decibel loss, or any other quantity or desired test. The testing cable pair 28 simulates the technician's ability to be at two places at the same time. Two separate technicians (e.g., a central office technician and an outside, field technician) are no longer required for testing. Because the test line 10 is accessible at the telecommunications switch 12, facility technicians will also discover that precise fault location is much easier.

The telecommunications switch 12 may have various configurations. The telecommunications switch 12, for example, may include Advanced Intelligent Network (AIN) componentry. This Advanced Intelligent Network componentry controls many features of the telecommunications switch 12. The signaling between the telecommunications switch 12 and the Advanced Intelligent Network componentry, however, is well understood in the art and will not be further described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

The telecommunications switch 12 may also utilize a packet network architecture. Here the telecommunications switch 12 includes a packet-based "softswitch." This softswitch uses software control to provide voice, data, and video services by dynamically changing its connection data rates and protocols types. An application server interfaces with the softswitch via a packet protocol, such as Session Initiation Protocol (SIP). This application server includes voice service protocols, triggers, and operations that interface with the telecommunications switch 12.

Figure 2:
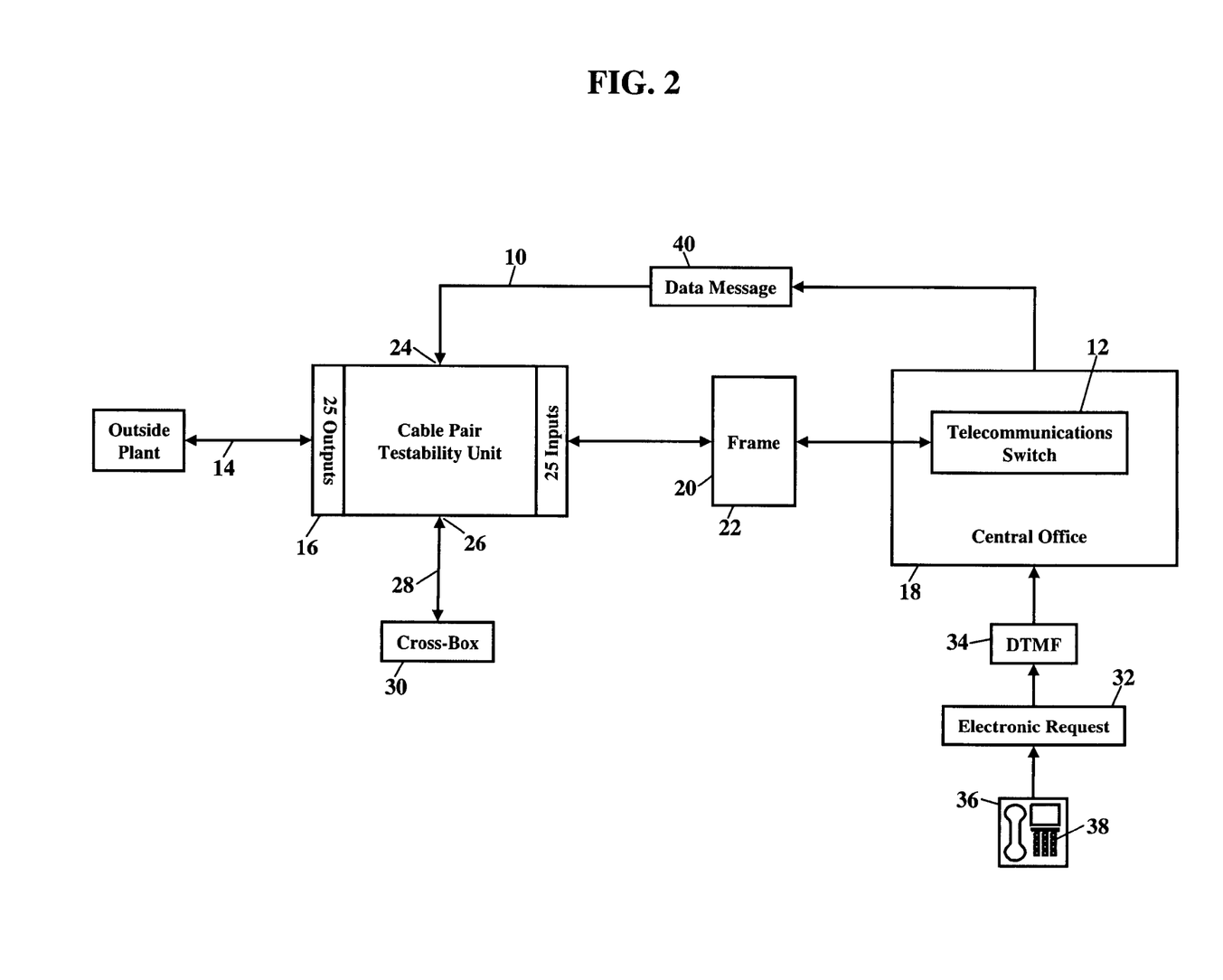
FIGS. 2-4 are schematics illustrating another embodiment of this invention.
Figure 3:
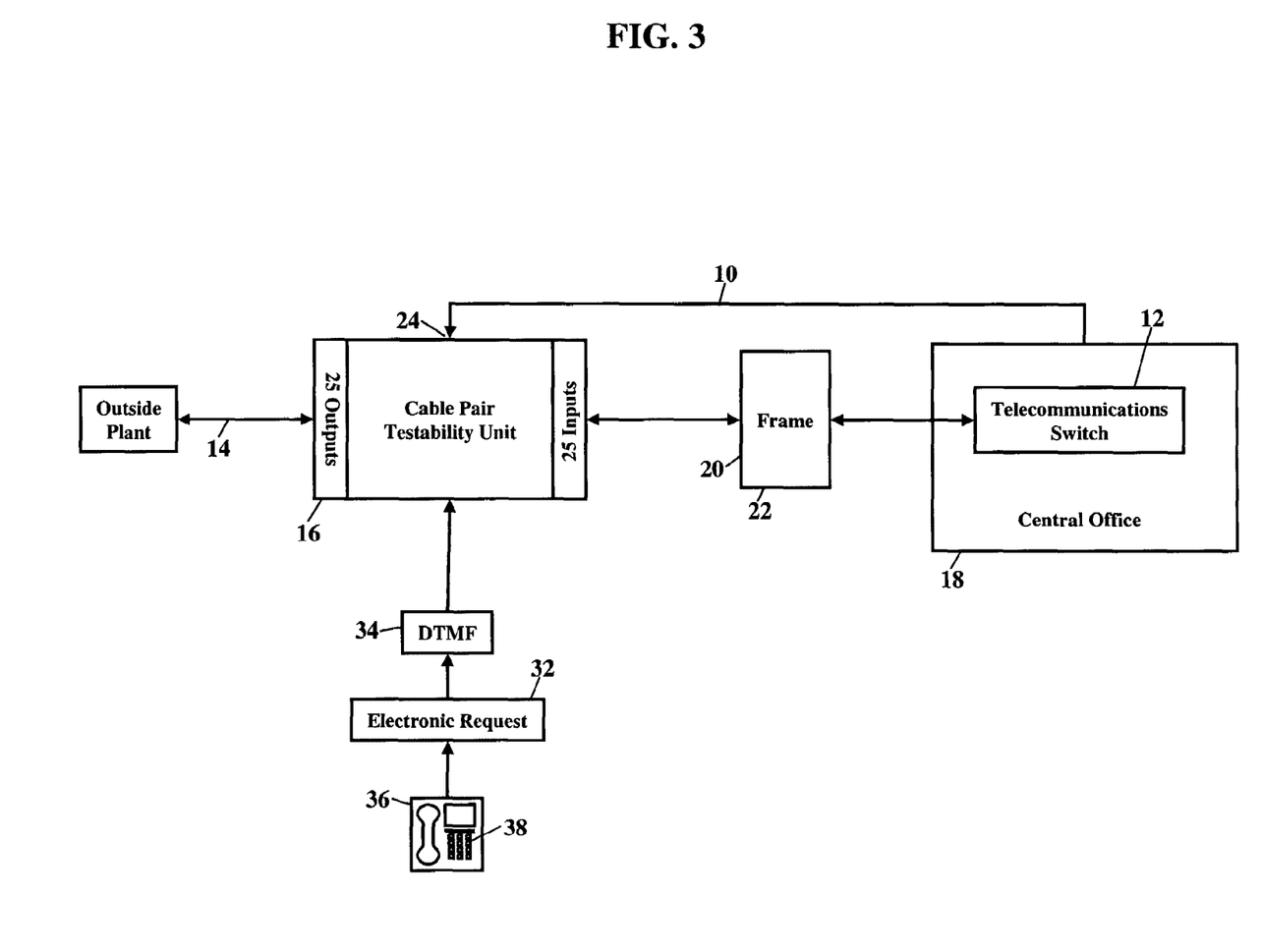
Figure 4:
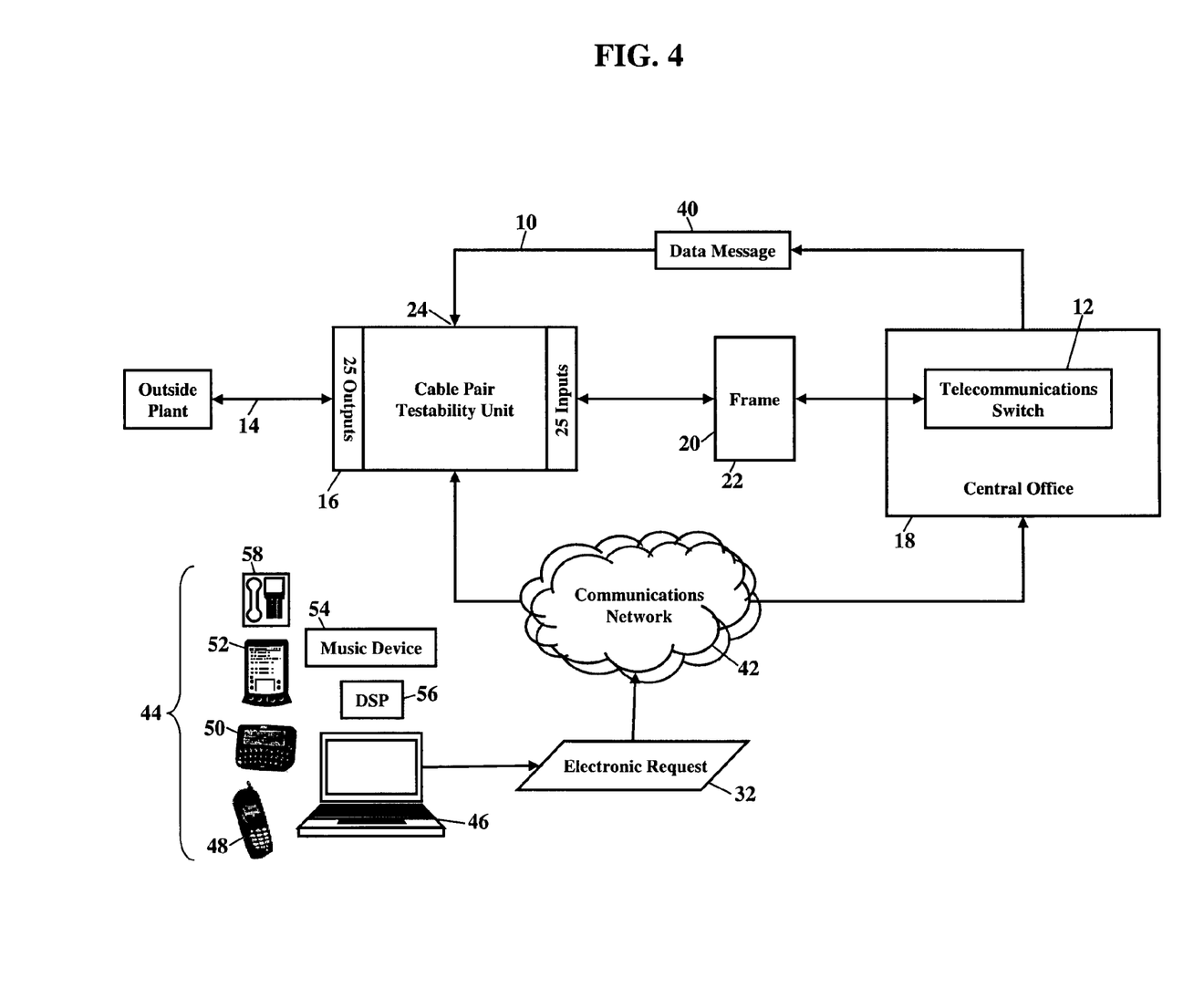

FIGS. 2-4 are schematics illustrating another embodiment of this invention. FIGS. 2-4 show the cable pair testability unit 16 responding to an electronic request 32. This electronic request 32 asks the cable pair testability unit 16 to establish the connection between the telecommunications switch 12, the inactive cable pair 14, and/or the testing cable pair 28. FIG. 2 shows a Dual Tone Multi-Frequency interface. The electronic request 32 is received by the telecommunications switch 12 and may include a Dual Tone Multi-Frequency (DTMF) 34. As those of ordinary skill in the art understand, Dual-Tone Multi-Frequency signaling is a means of transferring information from a party to the telecommunications network 56 through the use of in-band audio tones. Each digit of information is assigned a simultaneous combination of one of a lower group of frequencies and one of a higher group of frequencies to represent each digit or character. A technician, for example, could utilize a telephone 36 to dial-in and access the telecommunications switch 12. The telecommunications switch 12 would prompt the technician to enter a desired connection. The technician would respond by using a Dual Tone Multi-Frequency keypad 38 to enter a number or code identifying the desired connection. The technician, in this case, would enter the Dual Tone Multi-Frequency 34 that identifies the inactive cable pair 14. The electronic request 32, together with the Dual Tone Multi-Frequency 34, is received by the telecommunications switch 12. The telecommunications switch 12 then constructs a data message 40. The data message 40 is sent to the cable pair testability unit 16, and the data message 40 instructs the cable pair testability unit 16 to establish the connection between the test line 10 and the inactive cable pair 14. The data message 40 is preferably communicated along the test line 10, although the data message 40 may be communicated along any wireline/wireless connection between the telecommunications switch 12 and the cable pair testability unit 16. The connection between the test line 10 and the inactive cable pair 14 creates a signal path from the telecommunications switch 12 to the inactive cable pair 14. This connection allows the inactive cable pair 14 to be tested for faults. A Mechanized Loop Test, for example, may be performed on the inactive cable pair 14. A technician in the field, for example, may also utilize the inactive cable pair 14 to isolate a fault (or "trouble") in another line, and this testing may be accomplished without the assistance of, or independent of, personnel in the central office 18.

FIG. 3 shows another Dual Tone Multi-Frequency interface. Here the technician may directly access the cable pair testability unit 16. The technician utilizes the telephone 36 to dial-in and access the cable pair testability unit 16. The technician uses the Dual Tone Multi-Frequency keypad 38 to enter a number or code identifying the desired connection (e.g., a connection to the inactive cable pair 14). The electronic request 32, together with the Dual Tone Multi-Frequency 34, is received by the cable pair testability unit 16. The electronic request 32 instructs the cable pair testability unit 16 to establish the connection between the test line 10 and the inactive cable pair 14. The connection between the test line 10 and the inactive cable pair 14 creates a signal path from the telecommunications switch 12 to the inactive cable pair 14. This connection allows the inactive cable pair 14 to be tested for faults without the assistance of, or independent of, personnel in the central office 18.

FIG. 4 illustrates a network interface. The cable pair testability unit 16 and/or the telecommunications switch 12 may communicate with a communications network 42. The technician, for example, could utilize a communications device 44 to access the communications network 42. The communications device 44 would communicate the electronic request 32 via the communications network 42. If the electronic request 32 is received by the telecommunications switch 12, the telecommunications switch 12 then constructs the data message 40. The data message 40 is sent to the cable pair testability unit 16 and instructs the cable pair testability unit 16 to establish the connection between the test line 10 and the inactive cable pair 14. If, however, the electronic request 32 is received by the cable pair testability unit 16, the electronic request 32 instructs the cable pair testability unit 16 to establish the connection between the test line 10 and the inactive cable pair 14. The connection between the test line 10 and the inactive cable pair 14 creates a signal path from the telecommunications switch 12 to the inactive cable pair 14. This connection allows the inactive cable pair 14 to be tested for faults without the assistance of, or independent of, personnel in the central office 18.

The communications device 44 may be any wireline or wireless device. The communications device 44, for example, is preferably a mobile computer 46. This mobile computer 46 would allow the technician, or other person, to communicate with the communications network 42. The communications device 44, however, could include a wireless mobile phone 48, a pager 50, a personal digital assistant (PDA) 52, a digital music device 54 (such as a wireless .mp3/4 player), and/or any device with a digital signal processor (DSP) 56. The wireless mobile phone 48 could include a cellular phone, a Wireless Application Protocol phone, an Internet Protocol phone, or a satellite phone. The communications device 44 could also be a Plain Old Telephone Service (POTS) phone 58. Various standards and technologies could be used to support wireless communication to and from the communications device 44, such as 2G, 2.5G, and 3G cellular techniques, the Industrial and Scientific band of the electromagnetic spectrum, and the I.E.E.E 802 family of standards.

Figure 5:
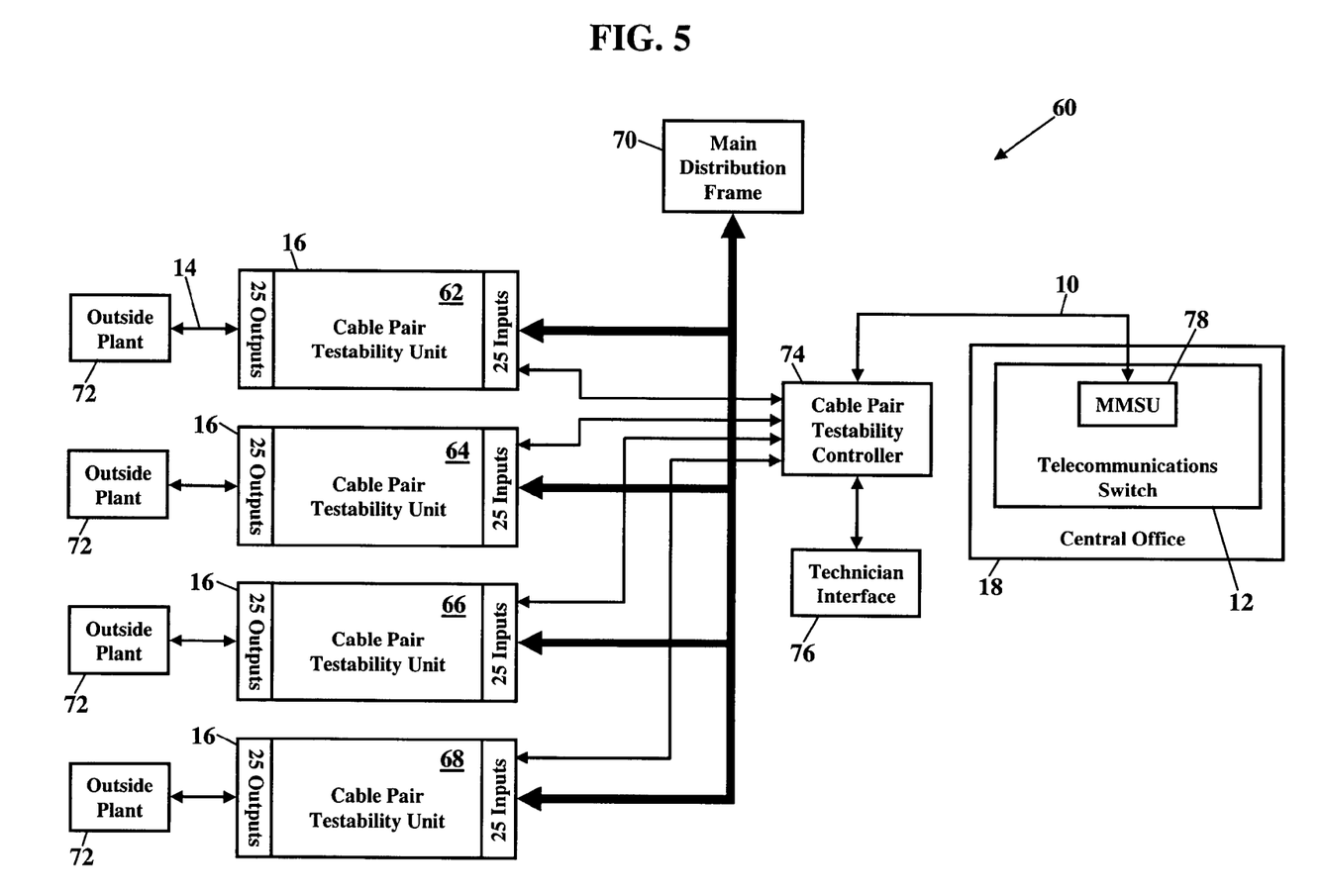
FIGS. 5-8 are schematics illustrating various operating environments for this invention.

FIG. 5 is a schematic illustrating an operating environment for this invention. FIG. 5 shows the cable pair testability unit 16 operating in a telecommunications network 60. The telecommunications network 60, in this environment, is an all-copper network. Here, however, the telecommunications network 60 includes multiple cable pair testability units 62, 64, 66, and 68. Each cable pair testability unit 16 bridges twenty five (25) cable pairs from a main distribution frame 70 to an outside plant 72. A cable pair testability controller 74 interfaces with each cable pair testability unit 16 and with the test line 10. The cable pair testability controller 74 also interfaces with a technician interface 76. The technician uses the technician interface 76 to specify which cable pair is to be tested (such as the inactive cable pair 14 connected to the cable pair testability unit 62). The technician interface 76 could utilize the Dual Tone Multi-Frequencies interface (as discussed with reference to FIGS. 2 and 3) and/or the network interface (as discussed with reference to FIG. 4). Once the technician specifies the desired cable pair to be tested, the cable pair testability controller 74 determines which cable pair testability unit 16 connects to that desired cable pair. The cable pair testability controller 74 then establishes a connection between the test line 10 and the particular cable pair testability unit 16 serving the desired cable pair. The cable pair testability controller 74 also instructs the particular cable pair testability unit 16 to establish a connection with the desired cable pair. The cable pair testability controller 74, in this example, would establish a connection between the test line 10 and the cable pair testability unit 62 serving the inactive cable pair 14. The cable pair testability controller 74 also instructs the cable pair testability unit 62 to establish a connection with the inactive cable pair 14. The connection between the test line 10 and the inactive cable pair 14 creates a signal path from the telecommunications switch 12 to the inactive cable pair 14. This connection allows the inactive cable pair 14 to be tested for faults without the assistance of, or independent of, personnel in the central office 18.

FIG. 5 shows the test line 10 connected to a Modular Metallic Service Unit (MMSU) 78. As those of ordinary skill in the art recognize, the Modular Metallic Service Unit 78 is a test shelf for the LUCENT® 5ESS class 5 switch (LUCENT® is a registered trademark of Lucent Technologies, Inc., 600 Mountain Ave., Murray Hill, N.J. 07974-0636, (908) 582-8500). The Modular Metallic Service Unit 78 contains special, switchable pairs called junctors that enable orderly, rapid testing of line pairs. Although FIG. 5 shows the test line 10 connected to the Modular Metallic Service Unit 78, an equivalent test shelf exists in every switch.

FIG. 5, then, illustrates a testability scheme for the copper-only telecommunications network 60. An electrical connection is established from the Modular Metallic Service Unit 78 on the LUCENT® 5ESS telecommunications switch 12. The test line 10 connects the Modular Metallic Service Unit 78 to the cable pair testability controller 74. The cable pair testability controller 74 interconnects the multiple cable pair testability units 62, 64, 66, and 68. The multiple cable pair testability units 62, 64, 66, and 68 provide concentration for test purposes. These multiple cable pair testability units (62, 64, 66, or 68) also provide a simpler interface between the Modular Metallic Service Unit 78 and the telecommunications switch 12. The cable pair testability controller 74 determines which cable pair testability unit (62, 64, 66, or 68) is appropriate. The cable pair testability controller 74 then establishes a connection to the appropriate cable pair testability unit (62, 64, 66, or 68) for the requested cable pair. Once the electrical connection is established, testing can begin. The cable pair testability controller 74, in this operating environment, is located inside the central office 18 and near the telecommunications switch 12. The cable pair testability units 62, 64, 66, and 68 are also located inside the central office 18, however, on the field side of the main distribution frame 70 just after any protection coils.

Figure 6:
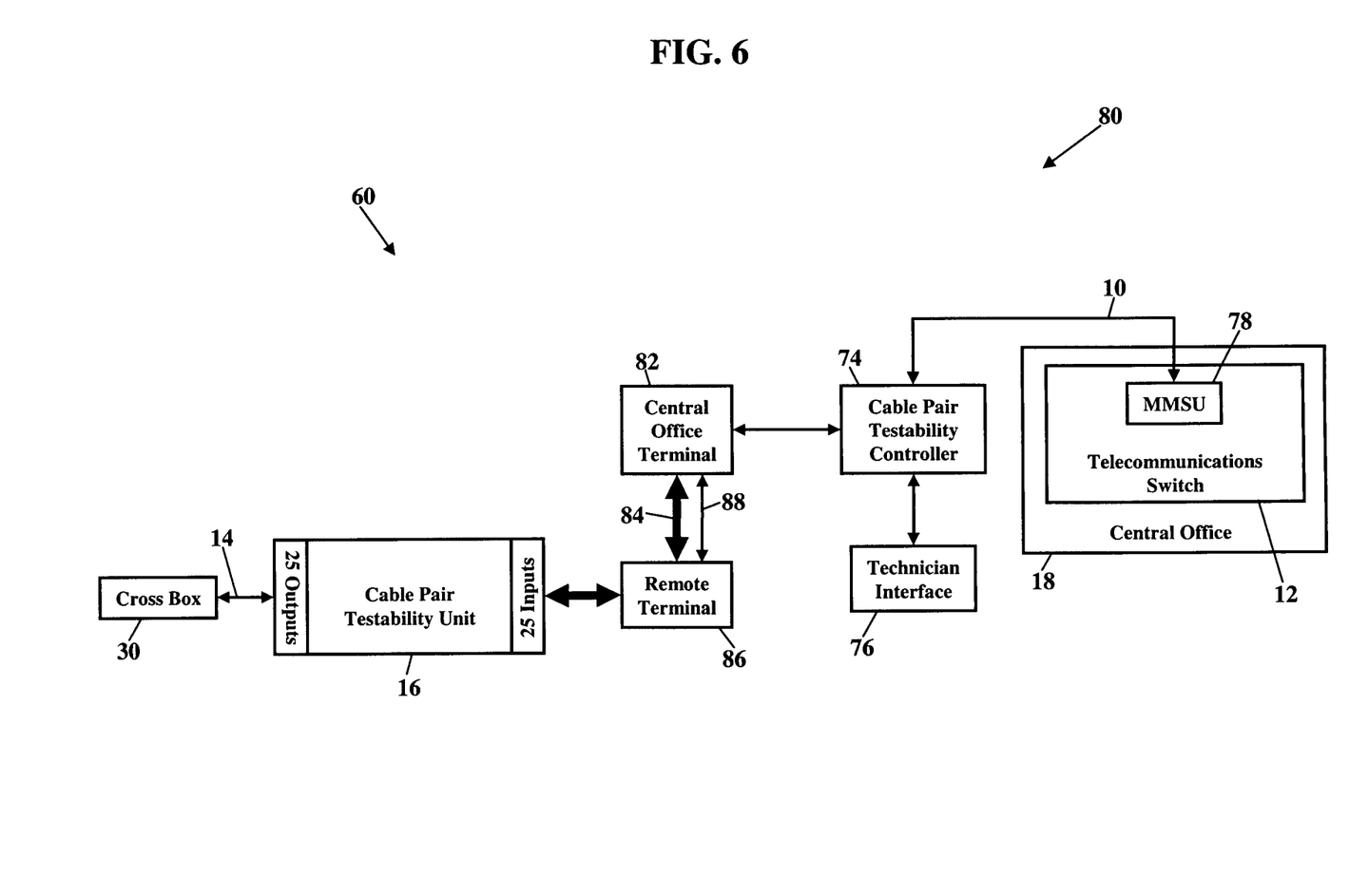

FIG. 6 is a schematic illustrating another operating environment for this invention. FIG. 6 shows the telecommunications network 60 including a universal Subscriber Loop Carrier system 80. As those of ordinary skill in the art understand, the Subscriber Loop Carrier system 80 is a technology that extends features out to customers beyond a certain distance from the central office 18. The Subscriber Loop Carrier system 80 provides a digital connection between the central office 18 and the physical Subscriber Loop Carrier site. The Subscriber Loop Carrier system 80 then converts those digital signals to analog signals for the customer's Plain Old Telephone Service. As FIG. 6 shows, an analog dial tone is provided from the Modular Metallic Service Unit 78 in the telecommunications switch 12. A central office terminal (COT) 82 converts the analog signal to a digital signal and then multiplexes that digital signal onto a T1 line 84. The digital signal is carried along the T1 line 84 to a remote terminal 86. The remote terminal 86 de-multiplexes the digital signal and then converts the digital signal back to an analog signal.

A testability scheme for the universal Subscriber Loop Carrier system 80 utilizes a similar connection path. A test path, for example, originates at the Modular Metallic Service Unit 78. The test line 10 connects the Modular Metallic Service Unit 78 to the cable pair testability controller 74. The cable pair testability controller 74 interfaces with the central office terminal 82. Any signals from the cable pair testability controller 74 are then multiplexed, along with all the other dial tones, onto the T1 line 84. The remote terminal 86 de-multiplexes and breaks out signals 88 for the cable pair testability unit 16. All other cable pairs are similarly de-multiplexed, except these other cable pairs are not sent straight from the remote terminal 86 to the cross box 30. These other cable pairs, instead, are connected to the cable pair testability unit 16 and then on to the cross box 30. This connection to the cable pair testability unit 16 provides the capability for technicians in the field to test from the cross box 30. The technicians could even test all the way back to a network interface customer site and "loop up" with a test pair. The technician might have to establish another line to able to test further down to a network interface, but this invention provides that ability. The technician could also utilize the vacant, inactive cable pair 14 and test from the remote terminal 86. The technician, for example, could test all the copper lines after the remote terminal 86 for the status of vacant pairs.

Figure 7:
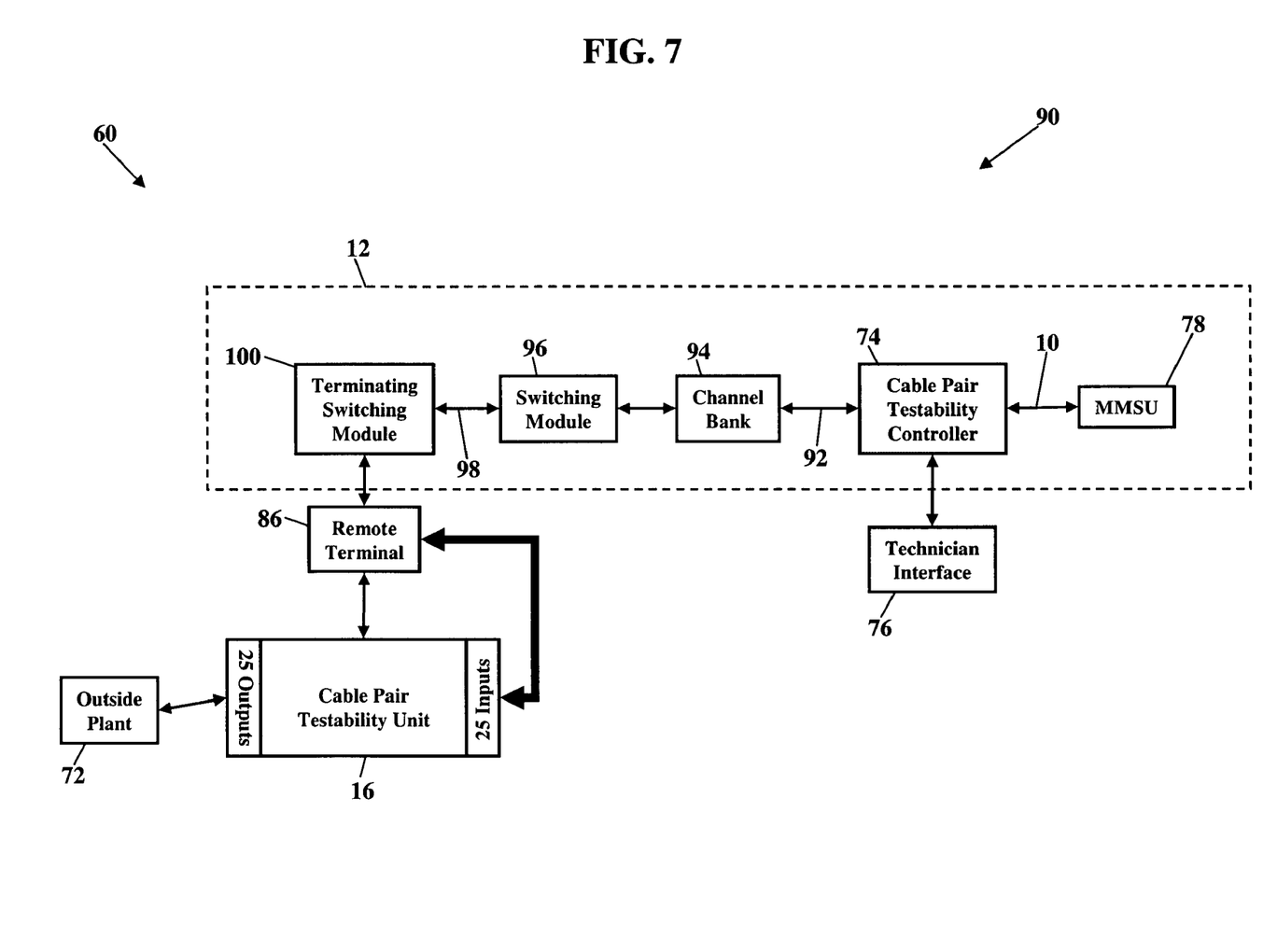

FIG. 7 is a schematic illustrating yet another operating environment for this invention. FIG. 7 is similar to FIG. 6, however, here the telecommunications network 60 includes an integrated Subscriber Loop Carrier system 90. Whereas the universal Subscriber Loop Carrier system 80 provides analog signals from the telecommunications switch 12, the integrated Subscriber Loop Carrier system 90 provides digital signals. These digital signals are already provided in a T1 form and sent to the remote terminal 86. The remote terminal 86 then converts those digital signals to analog. No analog-to-digital conversion, therefore, is required in the central office 18, and no multiplexing/de-multiplexing is required.

FIG. 7 shows a testability scheme for the integrated Subscriber Loop Carrier system 90. The test path connection, as before, originates at the Modular Metallic Service Unit 78. The test line 10 connects the Modular Metallic Service Unit 78 to the cable pair testability controller 74. A Digital Subscriber Line 92 then connects the cable pair testability controller 74 to a channel bank 94. Any channel bank technology may be used, although a D-4 channel bank is commonly used in many central offices. The channel bank 94 converts the digital signals to a T1 level and interfaces with a switching module 96 in the telecommunications switch 12. A "hairpin" connection 98 then carries signals from the switching module 96 to a terminating switching module 100 that carries the T1 signals to the remote terminal 86. The hairpin connection 98 is a dedicated path through the telecommunications switch 12 from one switching module to another switching module. The hairpin connection 98 provides a path to the appropriate channel that is selected on the T1 that rides up to the remote terminal 86. The remote terminal 86 then converts the digital signals to analog.

Figure 8:
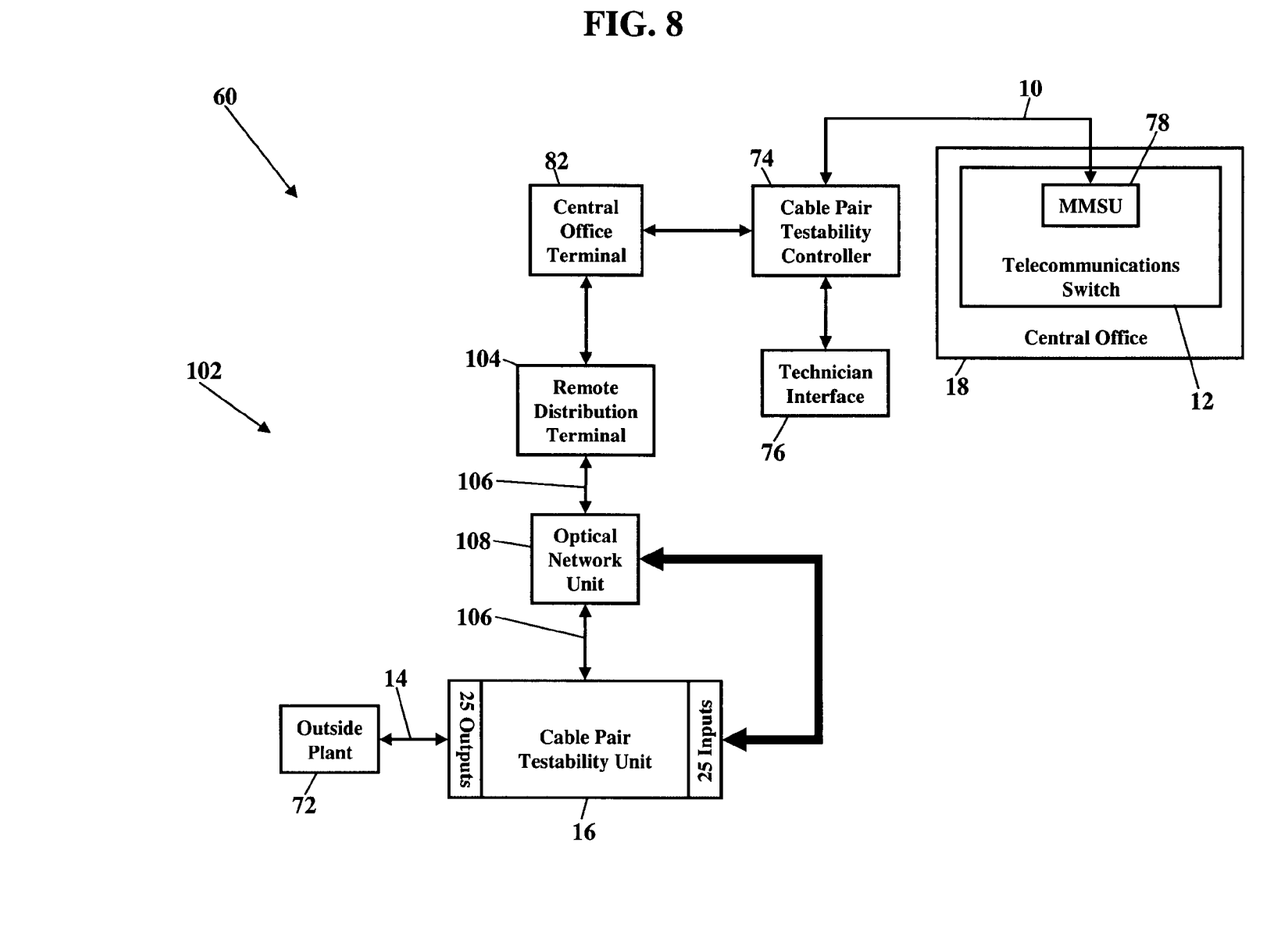

FIG. 8 is a schematic illustrating still another operating environment for this invention. FIG. 8 is similar to FIG. 6, however here the telecommunications network 60 includes an Optical Network Unit application 102. The test line 10 connects the Modular Metallic Service Unit 78 to the cable pair testability controller 74. The cable pair testability controller 74 interfaces with the central office terminal 82. A remote distribution terminal 104 breaks out signals 106 for the cable pair testability unit 16, however, all other cable pairs are connected to an optical network unit 108. The optical network unit 108 then interfaces with the cable pair testability unit 16.

Figure 9:
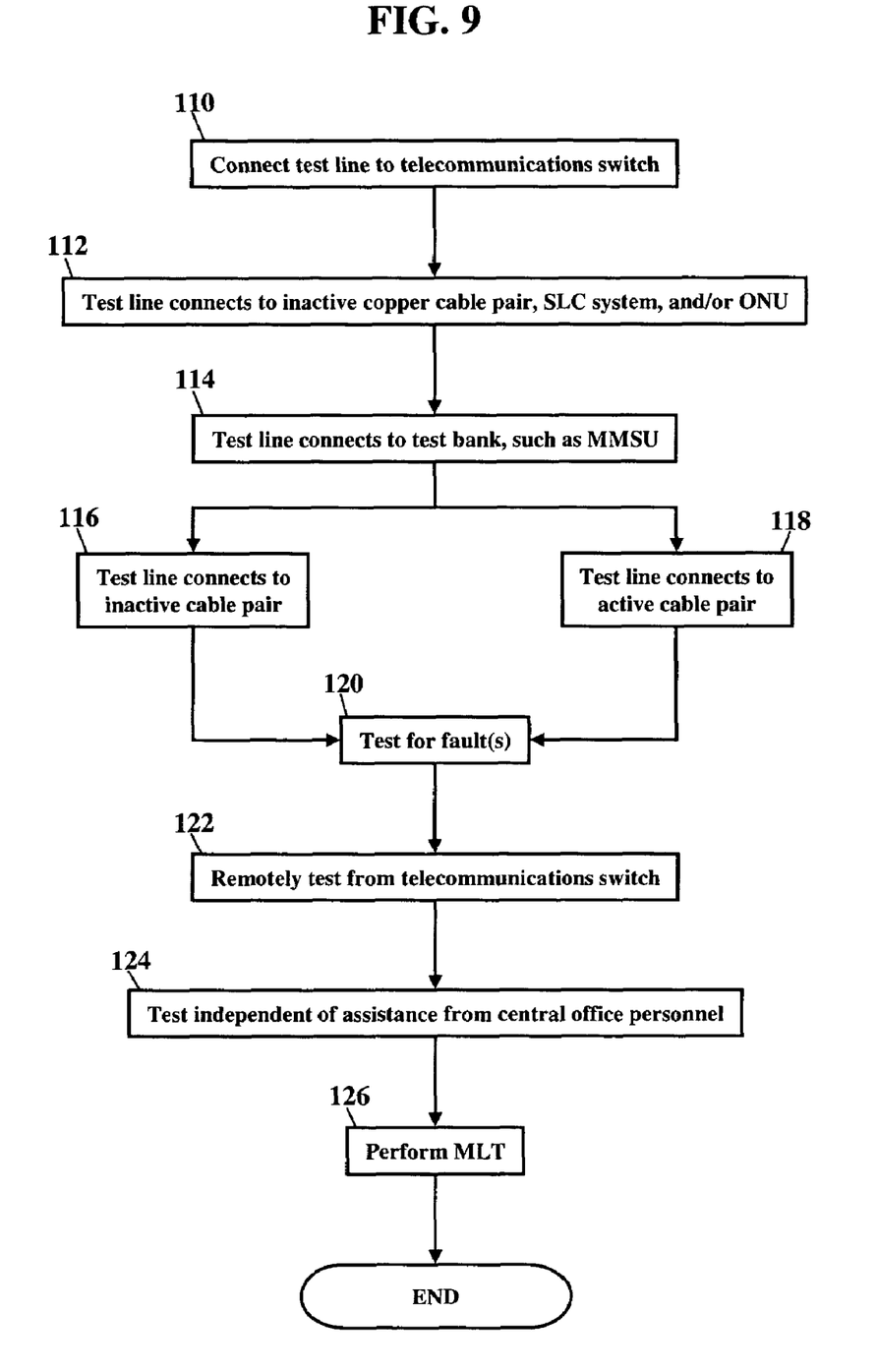
FIG. 9 is a flowchart showing one method of testing cable pairs in a telecommunications network.

FIG. 9 is a flowchart showing a method of testing cable pairs in a telecommunications network. A test line is connected to a telecommunications switch (Block 110). The test line may be connected to an inactive copper cable pair, a subscriber loop carrier (SLC) system, and/or an optical network unit (ONU) (Block 112). The test line is connected to a test bank (Block 114). The test bank may be a Modular Metallic Service Unit (MMSU) of the telecommunications switch. The test line is connected to an inactive cable pair (Block 116) and/or an active cable pair (Block 118). The inactive cable pair has no telecommunications service established for the inactive cable pair, while the active cable pair has established service. The connection between the test line and the active/inactive cable pair creates a signal path from the telecommunications switch to the active/inactive cable pair, thus allowing the active/inactive cable pair to be tested for faults (Block 120). The active/inactive cable pair may be remotely tested from the telecommunications switch (Block 122) and independent of assistance from personnel in a central office (Block 124). The active/inactive cable pair may be tested using a Mechanized Loop Test (Block 126).

Figure 10:
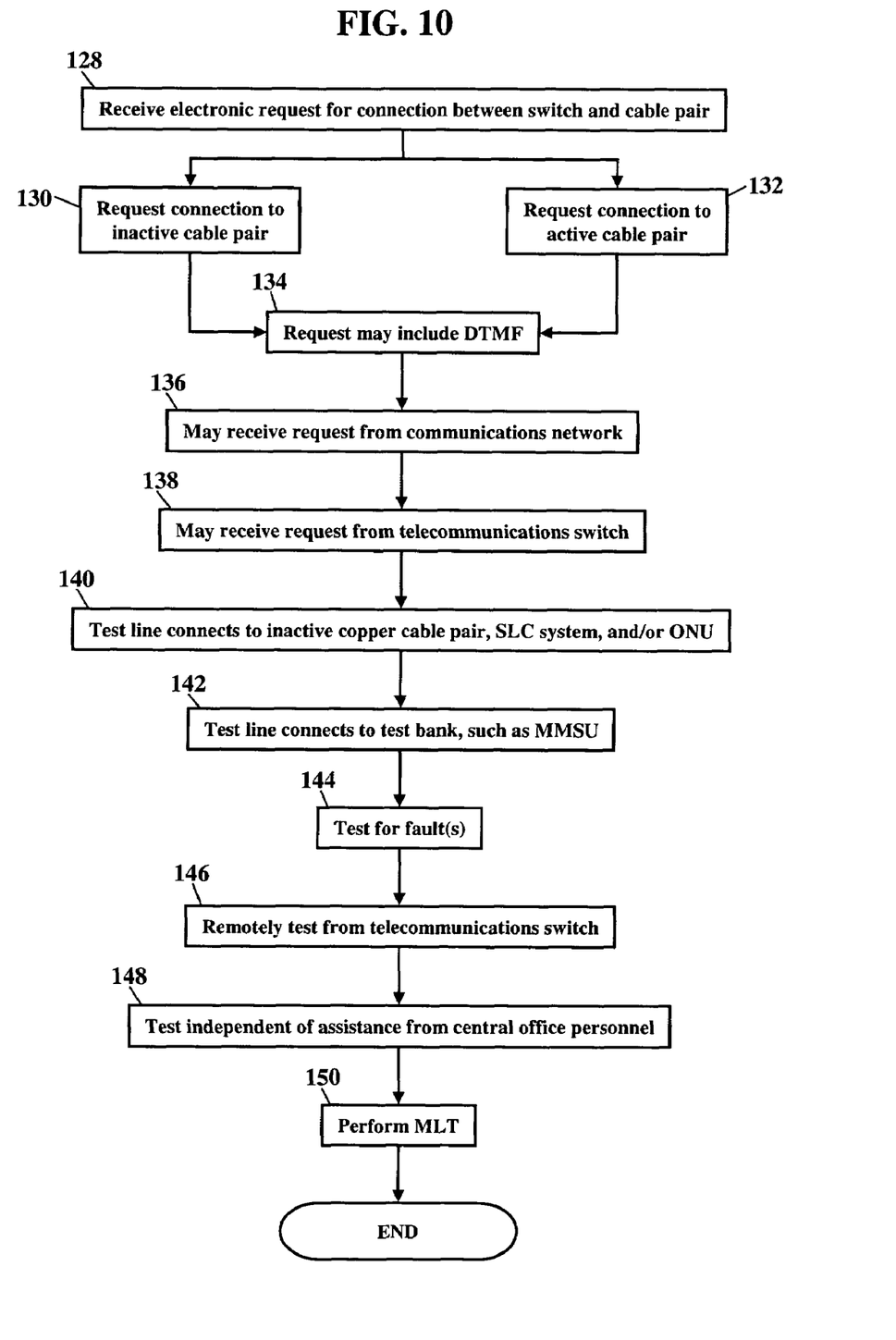
FIG. 10 is a flowchart showing another method of testing cable pairs.

FIG. 10 is a flowchart showing another method of testing cable pairs in a telecommunications network. An electronic request is received (Block 128) for a connection between a telecommunications switch and a particular cable pair. The particular cable pair may be an inactive cable pair (Block 130) and/or an active cable pair (Block 132). The inactive cable pair has no established telecommunications service, while the active cable pair has established service. The particular cable pair is one of multiple cable pairs in a telecommunications network. The electronic request may include a DTMF indicating the particular cable pair (Block 134). The electronic request may be received via a communications network (Block 136) and/or from the telecommunications switch (Block 138). The connection to the particular cable pair establishes a signal path from the telecommunications switch to the particular cable pair. The telecommunications switch may connect to an copper cable pair, a subscriber loop carrier (SLC) system, and/or an optical network unit (ONU) (Block 140). The test line is connected to a test bank (Block 142). The test bank may be a Modular Metallic Service Unit (MMSU) of the telecommunications switch. The particular cable pair is tested for faults (Block 144). The particular cable pair may be remotely tested from the telecommunications switch (Block 146) and independent of assistance from personnel in a central office (Block 148). The particular cable pair may be tested using a Mechanized Loop Test (Block 150).

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:

connecting a test line between a cable pair testability controller and a telecommunications switch, the test line connected at one end to the cable pair testability controller, and the test line connected at another end to a modular metallic service unit interfacing with the telecommunications switch;

connecting additional test lines between the cable pair testability controller and multiple cable pair testability units, each cable pair testability unit briding multiple cable pairs between multiple inputs and multiple outputs, each additional test line connected at one end to the cable pair testability controller, and each additional test line connected at another end to a respective one of the multiple cable pair testability units;

interfacing the cable pair testability controller to a technician interface;

receiving an electronic request from the technician interface, the electronic request specifying an inactive cable pair to be tested, the inactive cable pair having no telecommunications service established for the inactive cable pair;

determining by the cable pair testability controller which cable pair testability unit connects to the specified inactive cable pair;

establishing a connection at the cable pair testability controller between the test line and one of the additional test lines to a selected cable pair testability unit serving the specified inactive cable pair;

instructing the selected cable pair testability unit to establish a connection with the specified inactive cable pair, such that a signal path is created from the connection between the test line and the inactive cable pair creates a signal path from the modular metallic service unit in the telecommunications switch, through the cable pair testability controller and through the selected cable pair testability unit, to the inactive cable pair; and testing the inactive cable pair for faults.

2. A method according to claim 1, further comprising:
connecting the cable pair testability controller to a central office terminal; multiplexing signals from the cable pair testability controller with all dial tones onto a T1 line, the T1 line connected at one end to the central office terminal and the T1 line connected at another end to a remote terminal;
demultiplexing the signals from the cable pair testability controller; and
breaking out signals intended for the selected cable pair testability unit.

3. A method according to claim 2, further comprising:
connecting a digital subscriber line at one end to the pair testability controller and connecting another end of the digital subscriber line to a channel bank;
converting digital signals from the digital subscriber line to a T1 level;
interfacing with a switching module in the telecommunications switch;
establishing a hairpin connection to carry T1 signals from the switching module to a terminating switching module; and
communicating the T1 signals to the remote terminal, the hairpin connection creating a dedicated path through the telecommunications switch from one switching module to another switching module, the hairpin connection thus providing a path to an appropriate channel to the remote terminal; and
converting the T1 signals at the remote terminal to analog signals.

4. A method according to claim 1, wherein, remotely testing the inactive cable pair comprises remotely testing independent of assistance from personnel in a central office.

5. A method according to claim 1, wherein testing the inactive cable pair comprises performing a Mechanized Loop Test.

6. A method according to claim 1, further comprising connecting a testing cable to a field-side port of the testability unit, the testing cable being a spare cable connected between the field-side port and a cross box, and wherein the electronic request requests the testability unit to establish the connection between the test line, the testing cable, and the inactive cable pair.

7. A method according to claim 1, further comprising receiving the electronic request at the telecommunications switch and sending a data message to the testability unit, the data message instructing the testability unit to establish the connection between the test line and any of the multiple cable pairs identified in the electronic request.

8. A method system, comprising:
means for connecting a test line between a cable pair testability controller and a telecommunications switch, the test line connected at one end to the cable pair testability controller, and the test line connected at another end to a modular metallic service unit interfacing with the telecommunications switch;
means for connecting additional test lines between the cable pair testability controller and multiple cable pair testability units, each cable pair testability unit briding multiple cable pairs between multiple inputs and multiple outputs, each additional test line connected at one end to the cable pair testability controller, and each additional test line connected at another end to a respective one of the multiple cable pair testability units;
means for interfacing the cable pair testability controller to a technician interface;
means for receiving an electronic request from the technician interface, the electronic request specifying an inactive cable pair to be tested, the inactive cable pair having no telecommunications service established for the inactive cable pair;
means for determining by the cable pair testability controller which cable pair testability unit connects to the specified inactive cable pair;
means for establishing a connection at the cable pair testability controller between the test line and one of the additional test lines to a selected cable pair testability unit serving the specified inactive cable pair;
means for instructing the selected cable pair testability unit to establish a connection with the specified inactive cable pair, such that a signal path is created from the connection between the test line and the inactive cable pair creates a signal path from the modular metallic service unit in the telecommunications switch, through the cable pair testability controller and through the selected cable pair testability unit, to the inactive cable pair; and
means for testing the inactive cable pair for faults.

9. A system according to claim 8, further comprising:
means for connecting the cable pair testability controller to a central office terminal;
means for multiplexing signals from the cable pair testability controller with all dial tones onto a T1 line, the T1 line connected at one end to the central office terminal and the T1 line connected at another end to a remote terminal;
means for demultiplexing the signals from the cable pair testability controller; and
means for breaking out signals intended for the selected cable pair testability unit.

10. A system according to claim 9, further comprising:
means for connecting a digital subscriber line at one end to the cable pair testability controller and connecting another end of the digital subscriber line to a channel bank;
means for converting digital signals from the digital subscriber line to a T1 level;
means for interfacing with a switching module in the telecommunications switch;
means for establishing a hairpin connection to carry T1 signals from the switching module to a terminating switching module; and
means for communicating the T1 signals to the remote terminal, the hairpin connection creating a dedicated path through the telecommunications switch from one switching module to another switching module, the hairpin connection thus providing a path to an appropriate channel to the remote terminal; and
means for converting the T1 signals at the remote terminal to analog signals.

11. A system according to claim 8, further comprising means for testing in a location remote from the telecommunications switch.

12. A system according to claim 8, further comprising means for testing independent of assistance from personnel in a central office.

13. A system according to claim 8, further comprising means for performing a Mechanized Loop Test.

* * * * *